US011164028B2

(12) United States Patent
Popov et al.

(10) Patent No.: US 11,164,028 B2
(45) Date of Patent: Nov. 2, 2021

(54) LICENSE PLATE DETECTION SYSTEM

(71) Applicant: Nortek Security & Control LLC, Carlsbad, CA (US)

(72) Inventors: Ilya Popov, Novgorod (RU); Krishna Khadloya, San Jose, CA (US); Sofiya Klyan, Novgorod (RU)

(73) Assignee: Nortek Security & Control LLC, Carlsbad, CA (US)

( * ) Notice: Subject to any disclaimer, the term of this patent is extended or adjusted under 35 U.S.C. 154(b) by 46 days.

(21) Appl. No.: 16/444,941

(22) Filed: Jun. 18, 2019

(65) Prior Publication Data
US 2020/0401833 A1   Dec. 24, 2020

(51) Int. Cl.
*G06K 9/32* (2006.01)
*G06K 9/62* (2006.01)
*G06N 3/04* (2006.01)
*G06K 9/00* (2006.01)
*G06N 3/08* (2006.01)

(52) U.S. Cl.
CPC ....... *G06K 9/3258* (2013.01); *G06K 9/00718* (2013.01); *G06K 9/6256* (2013.01); *G06K 9/6262* (2013.01); *G06N 3/04* (2013.01); *G06N 3/08* (2013.01); *G06K 2209/15* (2013.01)

(58) Field of Classification Search
CPC .............. G06K 9/3258; G06K 9/6256; G06K 9/00718; G06K 9/6262; G06K 2209/15; G06N 3/08; G06N 3/04
See application file for complete search history.

(56) References Cited

U.S. PATENT DOCUMENTS

| | | | |
|---|---|---|---|
| 9,158,995 B2 | 10/2015 | Rodriguez-serrano et al. | |
| 9,785,855 B2* | 10/2017 | Gordo Soldevila | G06K 9/4628 |
| 10,984,255 B1* | 4/2021 | Schmer | G06K 9/6292 |
| 11,030,466 B2* | 6/2021 | Popov | G06K 9/00785 |
| 2017/0177965 A1* | 6/2017 | Gordo Soldevila | G06K 9/4628 |
| 2017/0300786 A1 | 10/2017 | Gope et al. | |

FOREIGN PATENT DOCUMENTS

| | | |
|---|---|---|
| CN | 107220638 | 9/2017 |
| CN | 108091141 | 5/2018 |
| CN | 104299006 | 11/2018 |

OTHER PUBLICATIONS

Ankush Roy and Debarshi Patanjali Ghoshal entitled: Number Plate Recognition for Use in Different Countries Using an Improved Segmentation 978-1-4244-9581-8/11 © 2011 IEEE (Year: 2011).*

(Continued)

*Primary Examiner* — Nancy Bitar
(74) *Attorney, Agent, or Firm* — Schwegman Lundberg & Woessner, P.A.

(57) ABSTRACT

A system for detecting license plates is described. The system receives raw data comprising images of license plates. A base version of a ground truth is prepared based on the raw data, using a generic license plate detection (LPD). The system prepares input data for training a deep learning network. The deep learning network is trained with the prepared input data. A newly trained generic (LPD) is formed using data generated by the existing generic (LPD).

18 Claims, 14 Drawing Sheets

(56) References Cited

OTHER PUBLICATIONS

Sergio Montazzolli and Claudio Jung entitled: Real-Time Brazilian License Plate Detection and Recognition Using Deep Convolutional Neural 2017 30th SIBGRAPI Conference on Graphics, Patterns and Images 2377-5416/17 © 2017 IEEE (Year: 2017).*

Gee-Sern Hsu, ArulMurugan Ambikapathi, Sheng-Luen Chung, Cheng-Po Su entitled: Robust License Plate Detection In The Wild IEEE AVSS 2017, Aug. 2017, Lecce, Italy 978-1-5386-2939-0/17/c 2017 IEEE (Year: 2017).*

* cited by examiner

LICENSE PLATE DETECTION SYSTEM

BACKGROUND

The present application generally relates to the field of license plate detection, and in particular, relates to methods and systems for effective forming and using an efficient and accurate License Plate Detection (LPD) system.

License plate detection and recognition (LPDR) is a technology that generally uses license plate detection approaches followed by optical character recognition (OCR) on images to read vehicle registration plates to identify the license plate identifiers. LPDR systems can be used in many day to day activities. For example, the LPDR systems may improve user's experience by allowing them to pass toll booths non-stop, by automatically determining in/out timestamps of vehicles in parking lots, and by automatically determining vehicles of condominium members for automatic gates opening. The LPDR systems are further helpful in finding a stolen vehicle by searching for license plates detected by police car cameras.

Presently, most LPDR systems have been developed using pure computer vision-based techniques such as morphology-based character segmentation with machine learning based Optical Character Recognition (OCR). However, these computer vision-based techniques may properly operate in simple situations: a license plate is clearly and fully visible, the orientation of the license plate from a horizontal line does not exceed 25 degrees, there is no or minimal tilt, and a minimal size of the license plate is greater than 100 pixels in width. The accuracy of existing LPDR systems may be compromised in complex situations: when there are shadows, noise, and dust over the license plate. Furthermore, existing LPDR systems may not provide accurate results when the license plate is partially overlapped with other objects, include stacked letters, display low contrast data, and the data in the license plate is poorly segmentable.

Moreover, for live video data detected by police car or traffic cameras, running a modern real-time license recognition model is computationally expensive and usually requires powerful hardware such as a Graphical Processing Unit (GPU). Many a times, the real-time license recognition has to be performed by edge devices that lack GPU and have limited processor capacity, and are highly constrained by weight and power availability.

In view of the above, there is a need for a license plate detection method and system that has an improved accuracy in the above-mentioned complex situations such as detecting license plates from different regions where each region has its own variety of license plate template standards.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
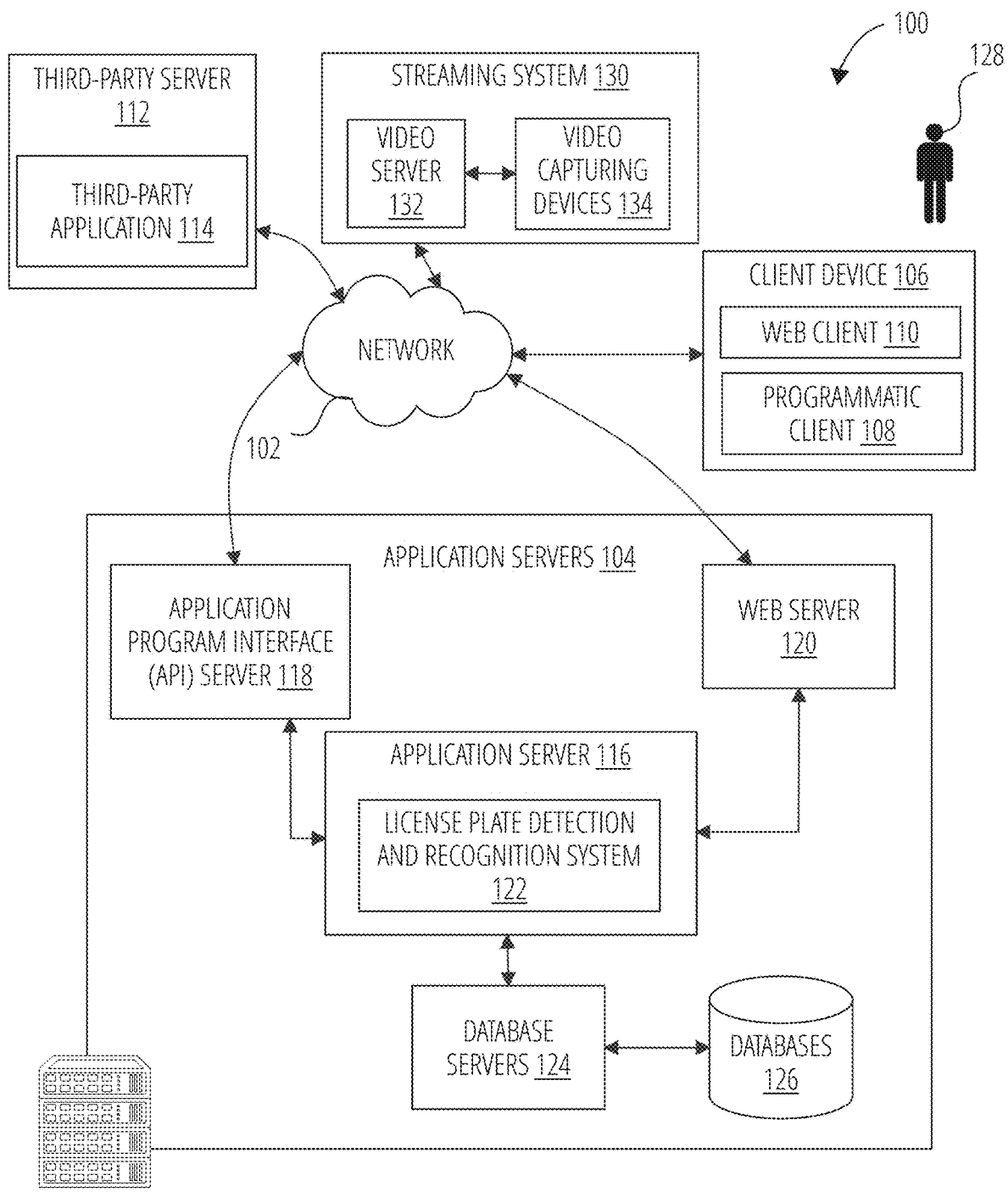
FIG. 1 is a diagrammatic representation of a networked environment in which the present disclosure may be deployed, in accordance with some example embodiments.

Example methods and systems are directed to a detection license plate system. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Preparation of accurate and effective License Plate Detection (LPD) is a non-trivial process that requires reasonable time and appropriate amount of human and computer resources. Complexities of real world scenarios (low light illumination, blur effect, low contrast, high tilt and span angles of a camera Field of View (FOV) introduce challenges to the LPD. For example, every country, region (within a country or across some countries) have its own standards of license plate formation. Even when license plates appear to be similar, the license plates (from different countries) vary in sizes, background images, formats, placement of characters, and exact alpha-numeric content. All these factors greatly slow the development of accurate license plate detection modules.

The present application describes a system and method to boost delivery of LPD modules by creating a generic license plate detector and speeding up of preparation of ground-truth that is used for preparation of customized license plate detectors. The same method also can be effectively used for detection of license plates for regions with customized license plates. In one example embodiment, the presently described system and method can be built using Convolutional Neural Network (CNN) based approach. Those of ordinary skill in the art will recognize that other machine learning algorithms may be used.

In one example embodiment, an LPD system collects data from different countries and develops appropriate Ground Truth (GT). LPD modules which are prepared for detection of license plates from some specific region/country may be further referred to as customized LPD modules. With enough data, the LPD system prepares a generic LPD module that can detect license plates from all the countries (and not just for countries data from which was used for its training).

In one example embodiment, the present application describes devices/machines/systems that detect a vehicle license plate (LP) in an image. The presently described system provides a high accuracy solution for LPD system. In one example embodiment, the LPD system includes a LP detection module that operates on one device/platform. The LP detection module may be built on top of a Convolutional Neural Network (CNN) model. In one example embodiment, the LPD system is based on a combination of multiple deep learning neural network sub-systems for detection, and enables higher quality, effectiveness and accuracy, high performance and scalability.

FIG. 1 is a diagrammatic representation of a network environment 100 in which some example embodiments of the present disclosure may be implemented or deployed. One or more application servers 104 provide server-side functionality via a network 102 to a networked user device (in the form of a client device 106 of the user 128) and a streaming system 130. A web client 110 (e.g., a browser) and a programmatic client 108 (e.g., an "app") are hosted and execute on the client device 106. The client device 106 can communicate with a streaming system 130 and application servers 104 via the network 102 or via other wireless or wired means. The streaming system 130 comprises a video server 132 and video capturing devices 134. The video capturing devices 134 generate image/video data and provides the image/video data to the video server 132.

An Application Program Interface (API) server 118 and a web server 120 provide respective programmatic and web interfaces to application servers 104. A specific application server 116 hosts a license plate detection and recognition system 122 that operates with the application server 116. In one example, the license plate detection and recognition system 122 receives video or image data from the streaming system 130. The license plate detection and recognition system 122 detects and recognizes license plates in the images or video frames from the streaming system 130. The operations performed by the license plate detection and recognition system 122 may be also performed or distributed to another server such as a third-party server 112. For example, the detection and/or recognition of license plates may be performed at the third-party server 112.

The web client 110 communicates with the license plate detection and recognition system 122 via the web interface supported by the web server 120. Similarly, the programmatic client 108 communicates with the license plate detection and recognition system 122 via the programmatic interface provided by the Application Program Interface (API) server 118. The third-party application 114 may, for example, be another application to support the license plate detection and recognition system 122 or mine the data from the license plate detection and recognition system 122. For example, the third-party application 114 may access location information, registration information, and other information related to the cars with the identified license plates. The application server 116 is shown to be communicatively coupled to database servers 124 that facilitates access to an information storage repository or databases 126. In an example embodiment, the databases 126 includes storage devices that store information to be published and/or processed by the license plate detection and recognition system 122.

Figure 2:
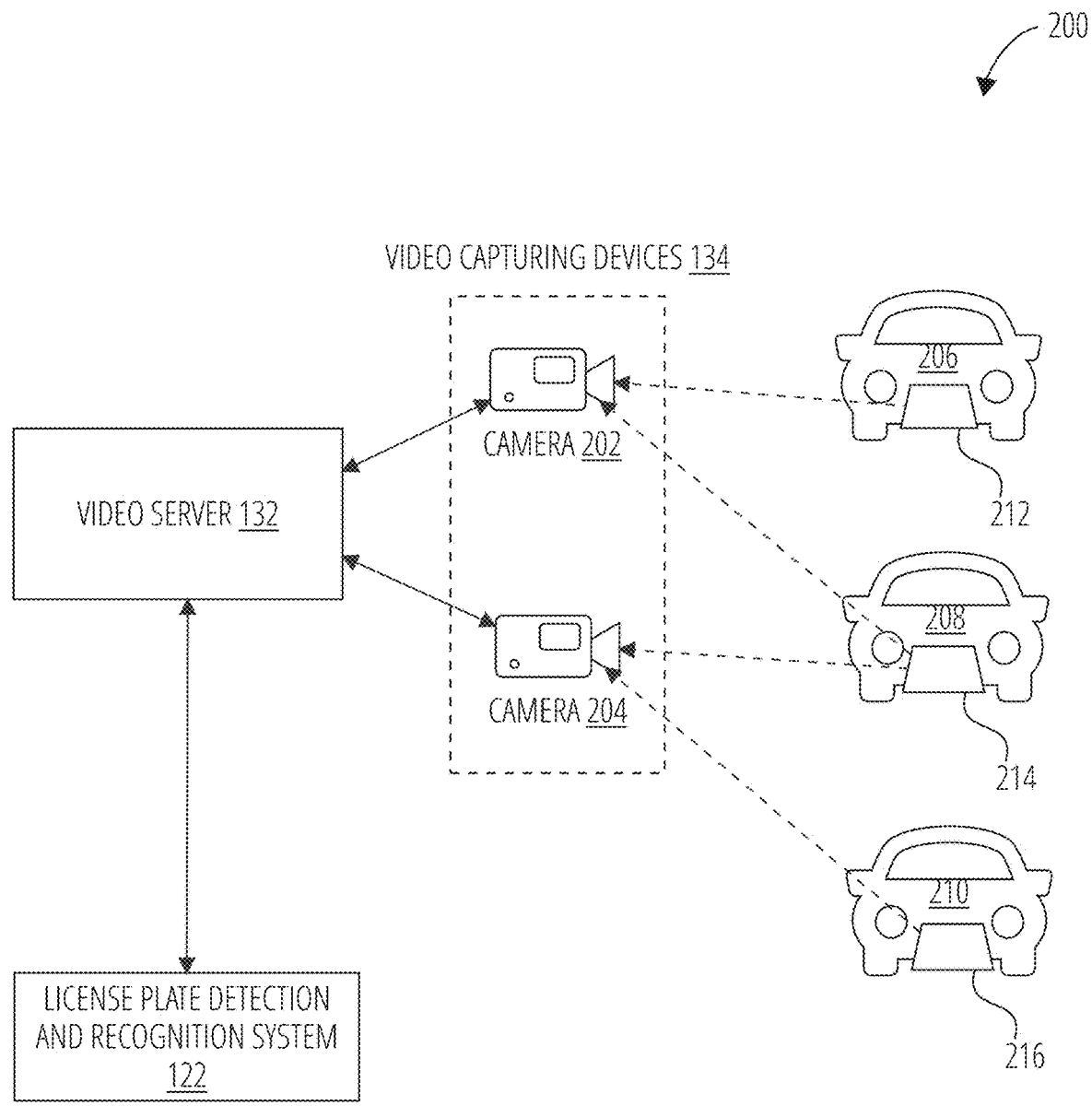
FIG. 2 illustrates an example operation of a system for detecting license plates in accordance with one embodiment.

FIG. 2 illustrates an example operation of a system for capturing and recognizing license plates in accordance with one embodiment. The video capturing devices 134 includes camera 202 and camera 204 that generate image/video data of the cars 206, 208, 210, and their corresponding license plates 212, 214, and 216. The video capturing devices 134 may be installed across multiple locations. Examples of locations include, but are not limited to, roads, parking spaces, garages, toll booths, outside residential areas, outside office spaces, outside public places (such as malls, recreational areas, museums, libraries, hospitals, police stations, fire stations, schools, colleges), and the like. Examples of the video capturing devices 134 include, but are not limited to, Closed-Circuit Television (CCTVs) cameras, High Definition (HD) cameras, non-HD cameras, handheld cameras, traffic cameras, police car cameras, cameras on unmanned aerial vehicles (UAVs) or any other video/image grabbing modules.

The video server 132 receives a dynamic imagery or a video footage from the video capturing devices 134. The video server 132 may transmit the associated data to the license plate detection and recognition system 122. A video/image archive (not shown) is a data storage that is configured to store pre-recorded or archived videos/images. The video/image archive may be composed of a plurality of local databases or remote databases. Also, the databases may be centralized and/or distributed. In an alternate scenario, the video/image archive may store data using a cloud-based scheme. Similar to the video server 132, the video/image archive may transmit data to the license plate detection and recognition system 122.

In one example, the video server 132 communicates the image/video data to the license plate detection and recognition system 122 for further processing. In another example embodiment, the detection of the license plates may be performed either at the license plate detection and recognition system 122 or at the video server 132 or a combination of both.

In one example, the license plate detection and recognition system 122 may be part of at least one of a surveillance system, a security system, a traffic monitoring system, a home security system, and a toll fee system. The license plate detection and recognition system 122 may be configured to receive data from at least one of: video server 132, the video/image archive, and/or client device 106. The data may be in form of one or more video streams and/or one or more images. In case of the one or more video streams, the license plate detection and recognition system 122 may convert each stream into a plurality of static images or frames. The license plate detection and recognition system 122 may process the one or more received images (or static image frames of videos) and execute a license plate detection technique. In the detection technique, the one or more images may be analyzed and one or more regions containing vehicle license plates may be detected.

In an example embodiment, the video capturing devices 134, the license plate detection and recognition system 122 may be integrated in a single device, where the single device is either a portable smartphone having a built-in camera and a display, or an integrated LPD device.

In another example embodiment, the license plate detection and recognition system 122 may be a custom LPD recognition server software to provide real-time license plate detection for all cameras on a local network.

In yet another example embodiment, the license plate detection and recognition system 122 may be a processing device that does not include a GPU, and includes limited CPU capabilities to run license plate detection and recognition processes. The license plate detection and recognition system 122 is described in more detail below with respect to FIG. 3.

Figure 3:
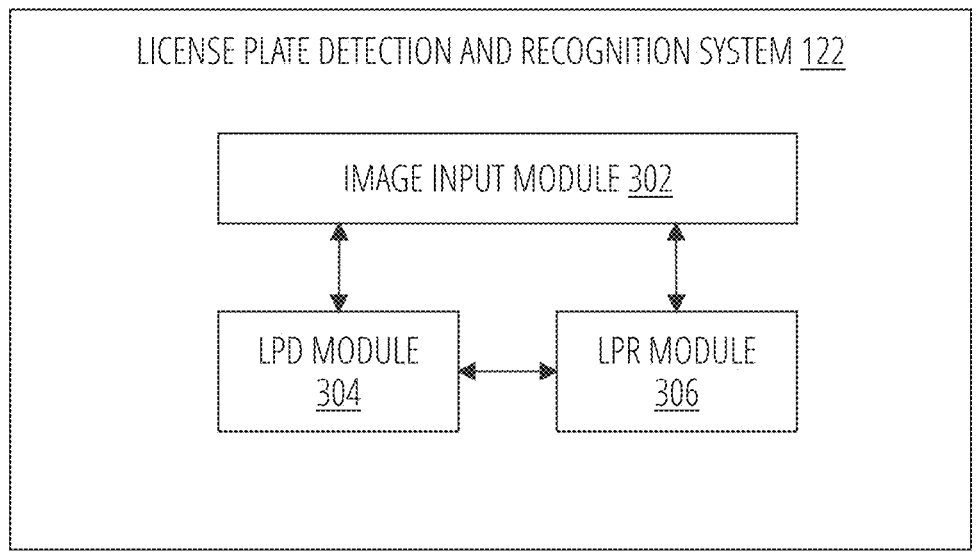
FIG. 3 is a block diagram illustrating an example of a license plate detection and recognition (LPDR) system in accordance with one example embodiment.

FIG. 3 is a block diagram illustrating an example of a license plate detection and recognition (LPDR) system in accordance with one example embodiment. The license plate detection and recognition system 122 includes an image input module 302 for receiving an input image/video, an LPD module 304 for detecting a license plate in the input image/video, and an LPR module 306 for recognizing the license plate in the input image/video.

The image input module 302 is configured to receive data from at least one of: the video server 132, the video/image archive, the client device 106, and the third-party server 112. The data may be in form of one or more video streams and/or one or more images. In case of the one or more video streams, the image input module 302 may convert each stream into a plurality of static images or frames.

In one example embodiment, the license plate detection and recognition system 122 enables a user to specify the following parameters before processing the input image:
- a country identifier
- processing mode: either a single image or video stream mode
- performance and accuracy profile: depending on required quality of processing, it is possible to switch to more accurate but more CPU consuming profile or go with a profile which is well balanced between high accuracy and performance
- multi-core support mode: depending on need, processing can be done using a single, several or all available cores of the license plate detection and recognition system 122.

Figure 11:
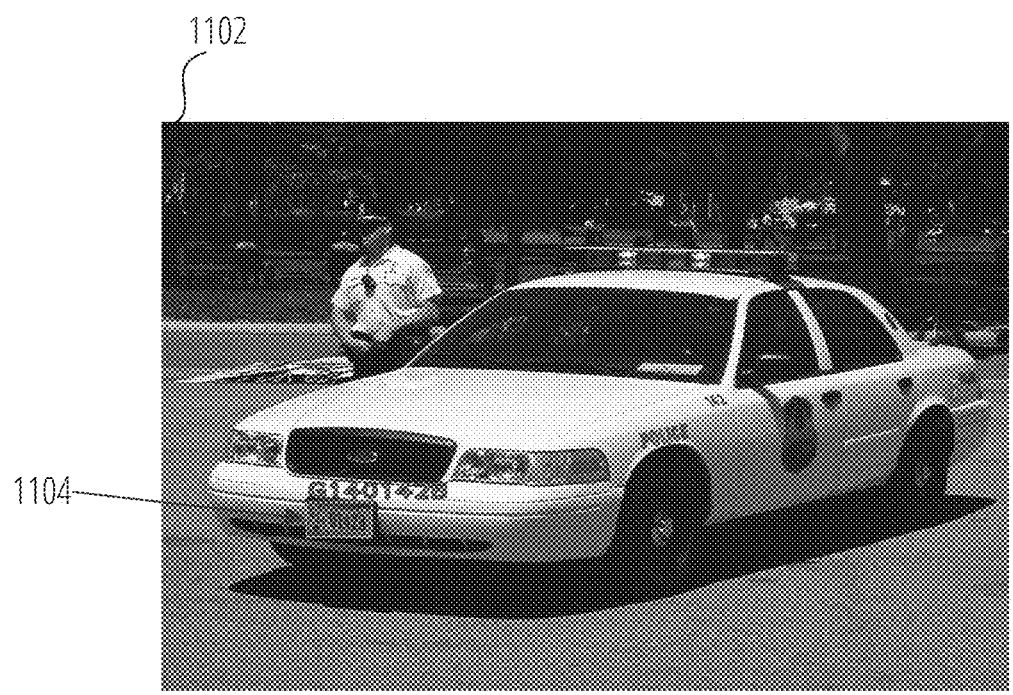
FIG. 11 illustrates an exemplary input image that includes a single license plate in accordance with one example embodiment.

The LPD module 304 is configured to analyze the input image from the image input module 302 and to identify one or more LP regions, such that each LP region includes an image of a license plate. With reference to FIG. 11, an image 1102 is received by the image input module 302, and is transferred to the LPD module 304, such that the LPD module 304 detects a license plate region 1104 containing a license plate.

In one example embodiment, the LPD module 304 may be built on top of a Convolutional Neural Network (CNN) based technology, where the CNN is a machine learning model related to computer vision and image processing that deals with detecting instances of semantic objects of a certain class in digital images and videos. In one example, the LPD module 304 may be implemented using a Single Shot Multi-box detector (SSD) or a DetectNet architecture that has been chosen as a default baseline, and optimized for accuracy and performance aspects, by adjusting a number of layers, an input image size, and classification layers.

In another example embodiment, the LPD module 304 may receive a color image (3 channel) as an input image, and then passes the input image through multiple computation layers to detect one or more LP regions that are most probable to be license plates. Each LP region may include a license plate, and the license plates detected in the image may be of different sizes.

In another example embodiment, the LPD module 304 detects the coordinates of bounding boxes of multiple license plates in an image. The LPD module 304 detects and marks the bounding boxes of the license plates in such a way that the bounding boxes when displayed on the display device mostly do not overlap with each other. The LPD module 304 is configured to detect and report all clearly visible LPs of expected sizes. Thus, based on the detection, the LPD module 304 may return an array of LP regions, referred to as LP_CANDIDATES_ARRAY {BBox, Type}, where for each LP region, the LPD module 304 may return coordinates of corresponding bounding boxes, and a type of the LP region. The type specifies, if the detected LP region is a one row license plate, or a multiple row license plate.

The LPD module 304 is further configured to filter the array of LP regions to remove the duplicate LP regions, and also less probable/false LP regions, to generate a filtered array of LP regions, referred to as LP_CANDIDATES_FILTERED_ARRAY {BBox, Type}. The process of filtering significantly reduces the total number of LP regions, thereby reducing the processing time, and increasing the overall efficiency of the license plate detection and recognition system 122.

In one example embodiment, the license plate detection and recognition system 122 may include a LP tracking module (not shown) to use a recognized LP identifier of an input image to update the recognized LP identifier of a previous input image, when the input image is a part of an input video stream.

In another example embodiment, the license plate detection and recognition system 122 may transmit the LP detection results to other components for further processing, storage, or such as the user interface for display. In an example, the coordinates of bounding boxes and license plate identifiers of recognized LPs may be sent as a message along with the video frames, to display labels and/or bounding boxes on live video streams on an associated display device. In one embodiment, the license plate detection and recognition system 122 may generate a video output for display in which bounding boxes are drawn around detected license plates, along with the recognized license identifier.

Although, the license plate detection and recognition system 122 is shown to have three modules, it would be apparent to one of ordinary skill in the art that the license plate detection and recognition system 122 may add more sub modules and neural networks to support additional countries, states, regions, and applications, where combination of numeral and character based signs on the license plates can be successfully detected and recognized.

In one example embodiment, the license plate detection and recognition system 122 may include a LP location detection module (not shown) that does automatic determination of a registered country/state of corresponding vehicle, based on content of a detected license plate.

Figure 4:
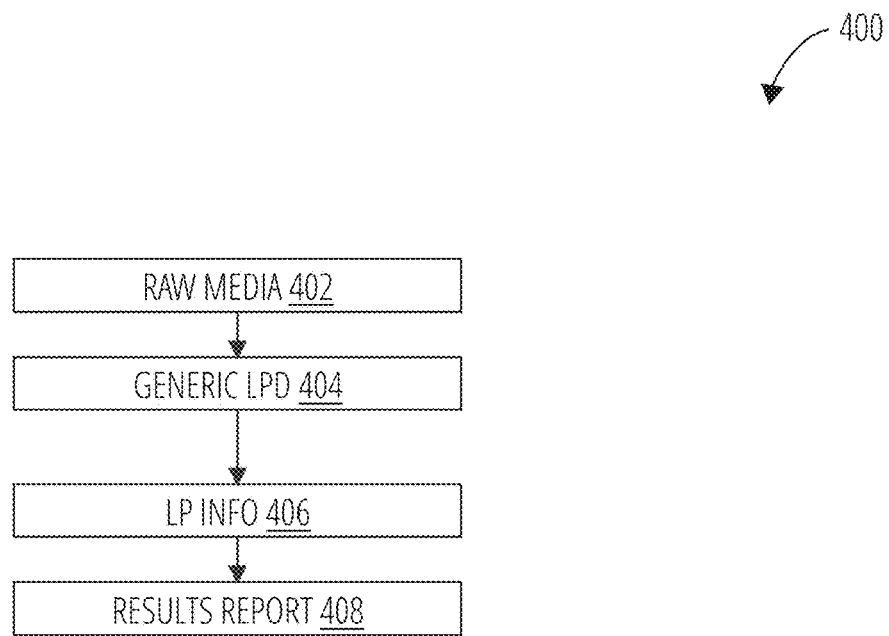
FIG. 4 illustrates an example of using a generic license plate detection module in accordance with one embodiment.

FIG. 4 illustrates an example of using a generic license plate detection module in accordance with one embodiment. The license plate detection and recognition system 122 is based on three main components: data, LPD module 304, and LPR module 306.

FIG. 4 illustrates using already trained LPD modules: raw media 402 (video or image) data is run through generic LPD 404 (Generic or Customized depending on the additional available information for that data). The result information (LP info 406) about detected license plates (LP Info) (e.g., bounding box, class, country) is saved into the report (results report 408).

Figure 5:
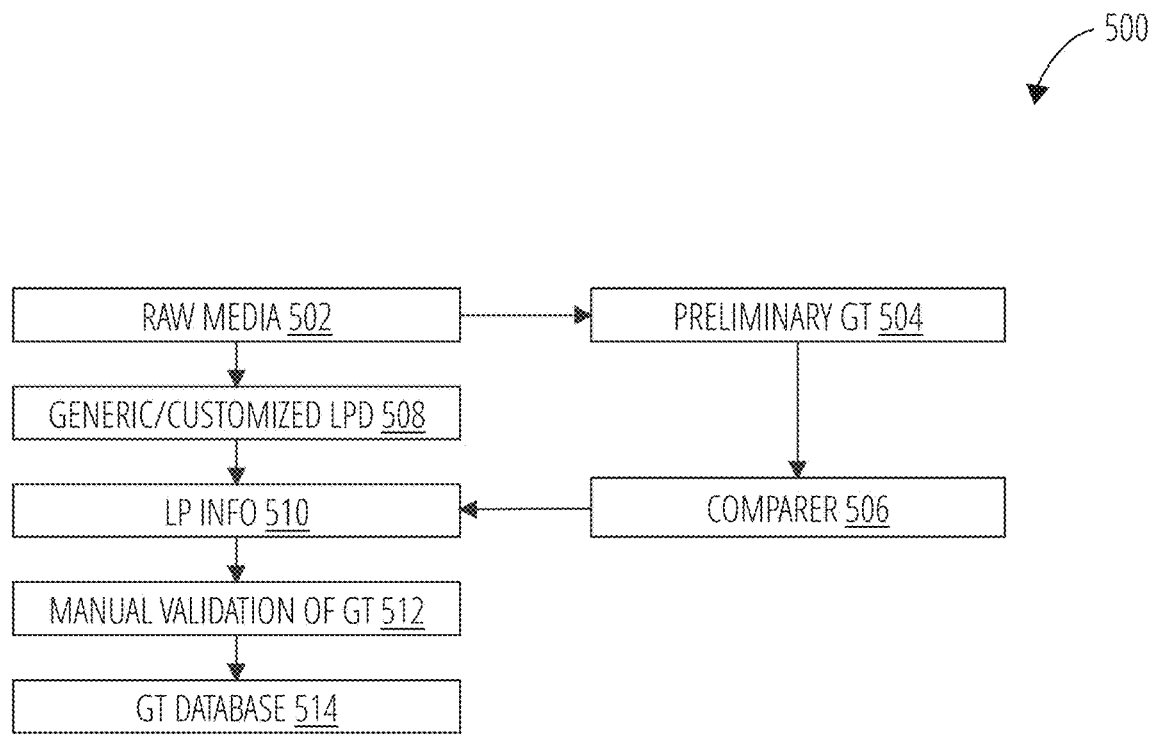
FIG. 5 illustrates an example of a ground truth preparation in accordance with one embodiment.

FIG. 5 illustrates an example of a ground truth preparation in accordance with one embodiment. In order to train LPD module 304, a large Ground Truth database is desirable. FIG. 5 illustrates a process of adding new data into this GT database. Raw media 502 is run through generic/customized LPD 508 (customized, if this data comes from the location which is already supported by the system, and generic otherwise). If some preliminary GT information is available, the preliminary GT 504 is compared using comparer 506 with the LPD processing results and a list of suggestions regarding its modification is made. GT is manually validated based on the LP info 510, the GT database 514 is updated before being added into system's database.

Figure 6:
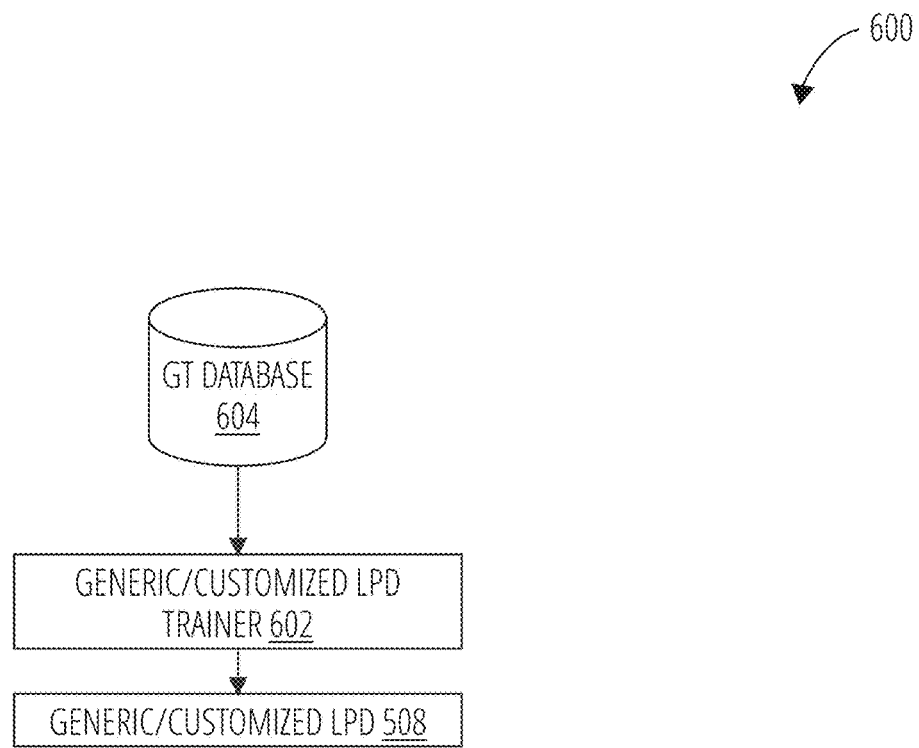
FIG. 6 illustrates an example of training a license plate detection module in accordance with one embodiment.

FIG. 6 illustrates an example of training a license plate detection module in accordance with one embodiment. GT database 604 is used with generic/customized LPD trainer 602 to train LPD module 304 (generic/customized LPD 508).

Figure 7:
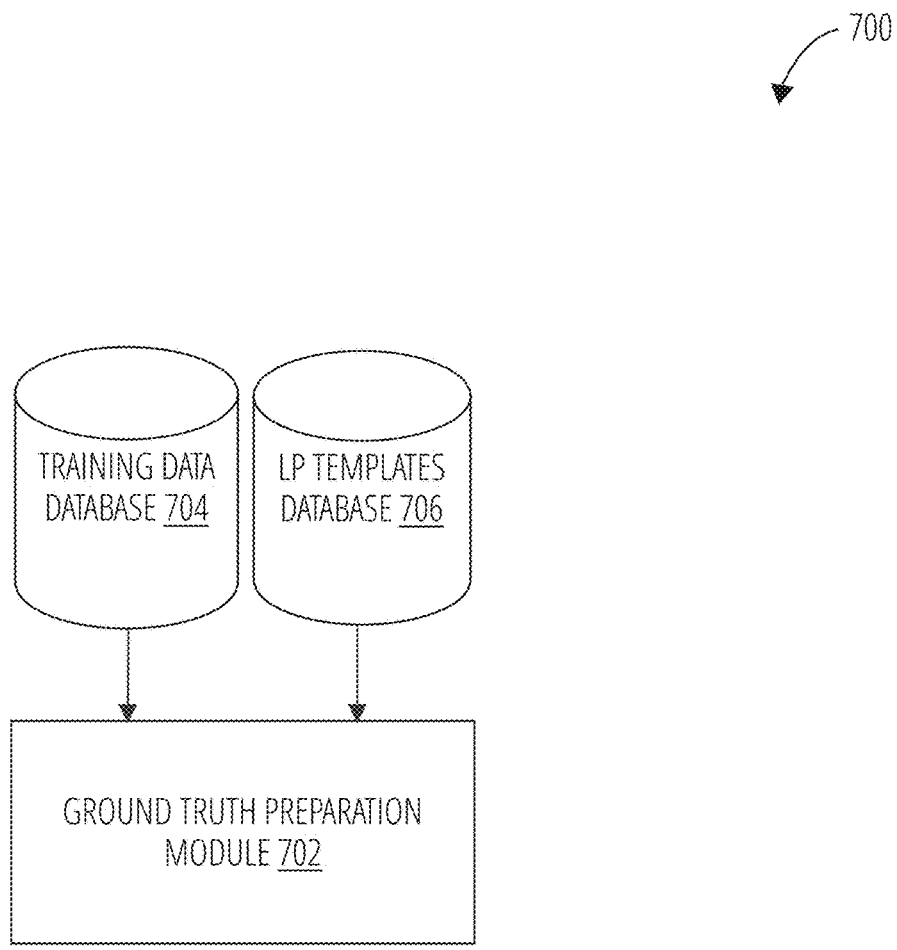
FIG. 7 illustrates a ground truth (GT) preparation module for training the LPDR system of FIG. 3, in accordance with one example embodiment.

FIG. 7 illustrates a ground truth (GT) preparation module for training the LPDR system of FIG. 3, in accordance with one example embodiment. The ground truth preparation module 702 prepares specific data needed for training and validation of different LPDR modules of the license plate detection and recognition system 122. The preparation of ground truth data may be performed prior operating machine learning and deep learning techniques. The feeding of reasonable data into a training process allows for control of what the ground truth preparation module 702 may interpret as reasonable data to be extracted from an input video frame or image. In one example embodiment, the ground truth preparation module 702 receives real data from a training data database 704, and LP templates forms from an LP templates database 706. Thereafter, the ground truth preparation module 702 prepares ground truth data for the license plate detection and recognition system 122, using LP ground truth preparation and verification tools, through LP template preparation procedure and fonts extraction.

Figure 8:
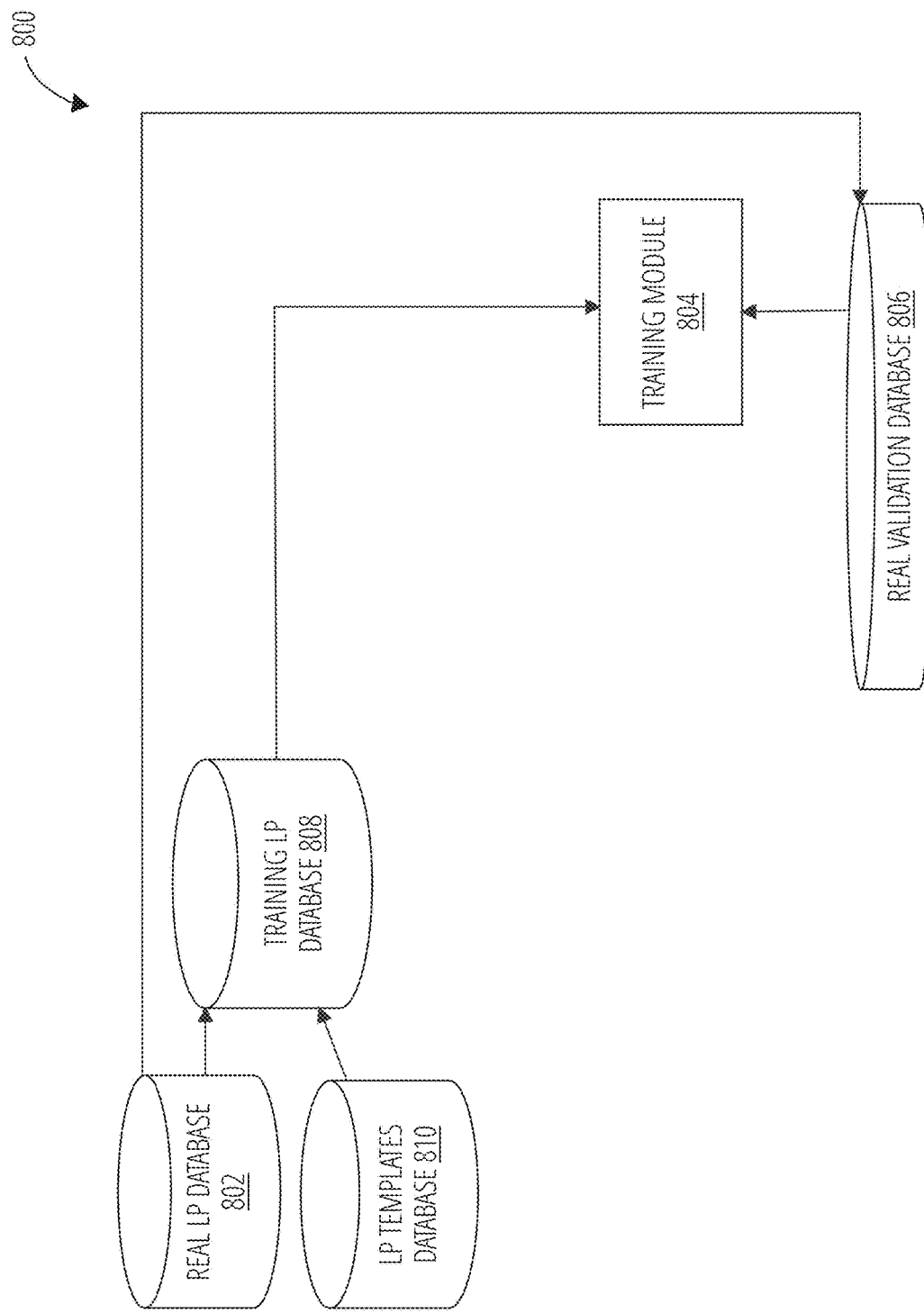
FIG. 8 illustrates preparation of LP detection module for forming the LP system of FIG. 3, in accordance with one example embodiment.

In one embodiment, the following information may be fed into the ground truth preparation module 702 to prepare ground truth for the LPD module 304:

Information regarding types of license plates, for example, one row license plate, two or multi-row license plate, as the license plates are distinguishable by the number of rows;
Information that the one row license plate detector is being used to detect license plates with stacked letters;
License plates which have sufficient size and observed for at least 50% of their width/height. It does not matter if content of a license plate is clearly visible or blurred, but if it can be detected by a person easily;
Alphanumeric template information accompanied with specific fonts used for generation of license plates onto training images;
LP bounding box points and number of LP identifier text rows on it for generation of license plates onto images which are re-used for further training;

In another example embodiment, the following information may be fed into the ground truth preparation module 702 to prepare ground truth for the LPD module 304:

Fully-visible and clearly recognizable license plates of training images
One or more templates for every unique license plate format, where the format usually includes an image of a template of a license plate without LP identifier
A mask image with information about how LP identifier data is supposed to be put on a template image
Information about regions of output for alphanumeric data accompanied with an output format
Fonts and sizes used for drawing characters over a LP template
Coordinates of bounding boxes for all license plates of training images
Region/state information of license plates of training images
Country information of license plates of training images FIG. 8 illustrates preparation of LPD module 304 for forming the LPDR system of FIG. 3, in accordance with one example embodiment. Real data from the real LP database 802 and LP templates forms from the LP templates database 810 form the Training LP database 808 and the validation LP database 806. Data from the Training LP database 808 is passed into the training module 804 and is used for training of the detector module. Data from the validation database 806 is passed into the training module 804 and is used for iterative validation of the training results.

Figure 9:
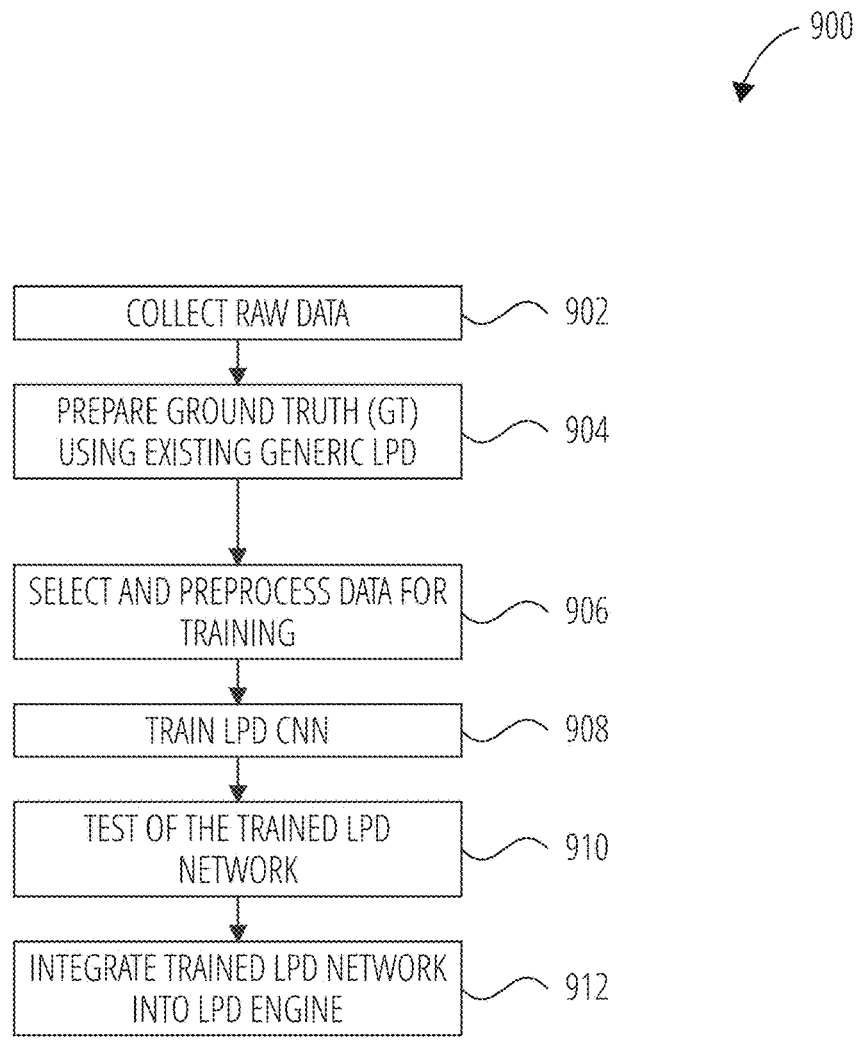
FIG. 9 is a flow diagram illustrating a method for training a LP detecting module in accordance with one embodiment.

FIG. 9 is a flow diagram illustrating a method for training a LP detecting module in accordance with one embodiment. For preparation of GT raw input media (images/video) with license plates is needed. Images and GT should represent a large variety of sizes, positions, backgrounds of the license plates. Since appearances of the license plates change drastically depending on the country and various types of license plates can be used within one country, for preparation of a generic LPD module it is required to obtain large collections of data images for significant amount of countries and each of these collections should contain samples for different types of license plates (police, military, commercial vehicles, private vehicles) issued in different regions of the country in different time periods. It is also required to obtain information about classes of license plates (one or multi-row), presence/absence of stacked letters. Only license plates that have width and height bigger than some threshold (in % from image resolution) can be used for training and validation purposes.

Having such information allows to prepare a generic LPD detector. Effective generic LPD allows to speed up preparation of GT regardless of license plate's origin, what in its turn boosts preparation of a new accurate customized LPD module. Typically every new iteration of revisiting of generic LPD module brings higher accuracy of autogenerated GT and hence gives a good boost in preparation of data for a new LPD module.

At block 902, the LPD module 304 collects the raw data. The new data for the new location can be obtained through different sources: from customers, using special services, from open legal sources. Sometimes raw images are accompanied by some additional information such as license plate IDs, bounding boxes, and vehicle types.

At block 904, the LPD module 304 prepares Ground Truth (GT) using already existing generic LPD modules. After new data is received, the current version of the generic LPD is run on it, producing information corresponding to license plates such as: bounding boxes, classes, country tags. This markup is considered to be a base version of Ground Truth (GT). In some cases, when new data already contains some information about bounding boxes and/or classes of the license plates, the generic LPD is used to automatically validate it. Automatically created/validated GT is then sent to data entry operators (DEO) for manual validation. After that a specific set of scripts is run on the validated GT to ensure that GT has a correct format and does not contain false bounding boxes that could have been manually added by mistake.

In one example embodiment, GT contains the following information about a license plate:
1. Class: single row or multi row;
2. Country;
3. Bounding box;
4. Label: license plates that are not fully visible or recognizable are marked with label "Ignore".

Some images may have to be modified in way to remove pieces of license plates which are visible only partially, because marking them as ignore potentially may result in worse accuracy as these may be included in the training database, while non-marking them as ignore may cause similar negative effect because these pieces of license plates would be used as negative samples during training phase.

At block 906, data for the training is randomly selected and then preprocessed. In one example embodiment, the process of preparing input data for training of the generic LPD consists of the following steps:
1. Gathering of all media (images and videos) data for all currently supported countries.
2. Preparation of video data: picking some reasonable amount of frames for each license plate and saving them as separate images in order to use them in the following training (required only for new videos that have not been processed in the same way before).
3. Collecting the previously gathered data separately for single row license plates and multiline license plates.
4. Splitting both (single row and multiline) sets of data into training and validation sets, then merging two training sets into one and two validation sets into one. Experiments have shown that picking some mean number of images per country in order to even the amount of input for every country instead of using all available data for all countries does not show any improvements on detector's accuracy, therefore all data is used.
5. Saving training and validation sets in a specific format, resizing images in order for all of them to fit in some fixed size in pixels. During this step images that do not contain bounding boxes and images that contain marked as "Ignore" bounding boxes with relative size smaller than some threshold are skipped.

At block 908, the LPD module 304 trains the LPD CNN. Training and validation sets obtained on the previous step are used to train a convolution neural network that takes an image as input and outputs bounding boxes that should correspond to license plates presented on this image along with a class for each bounding box (single row or multiline). Every prediction has its confidence, predictions with low confidences can be dismissed. Current implementation of the generic LPD uses a custom CNN based on DetectNet CNN, but other models and architectures that implement the same functionality can be used.

At block 910, the LPD module 304 tests the trained LPD network. The newly trained generic LPD gets tested on all data collected by the time of its creation excluding license plates with "Ignore" label and gets its parameters adjusted in order to show the best possible accuracy on that data (i.e. to have a high rate of True Detection and a reasonable low rate of False Detection).

At block 912, the LPD module 304 integrates the trained LPD network into an LPD engine. For example, the generic LPD can be included into product's engine and can be used by any customer requiring detection of license plates from any country. This allows to effectively detect license plates even for currently unsupported countries. An example of generic LPD's output can be found as a predicted bounding box.

Another application of the generic LPD is its usage for creating GT for all incoming raw data as described in block 904. It allows to significantly reduce amount of resources required for adding new data into database of license plates and helps to speedup the process of preparing of accurate LPD for some location.

Figure 10:
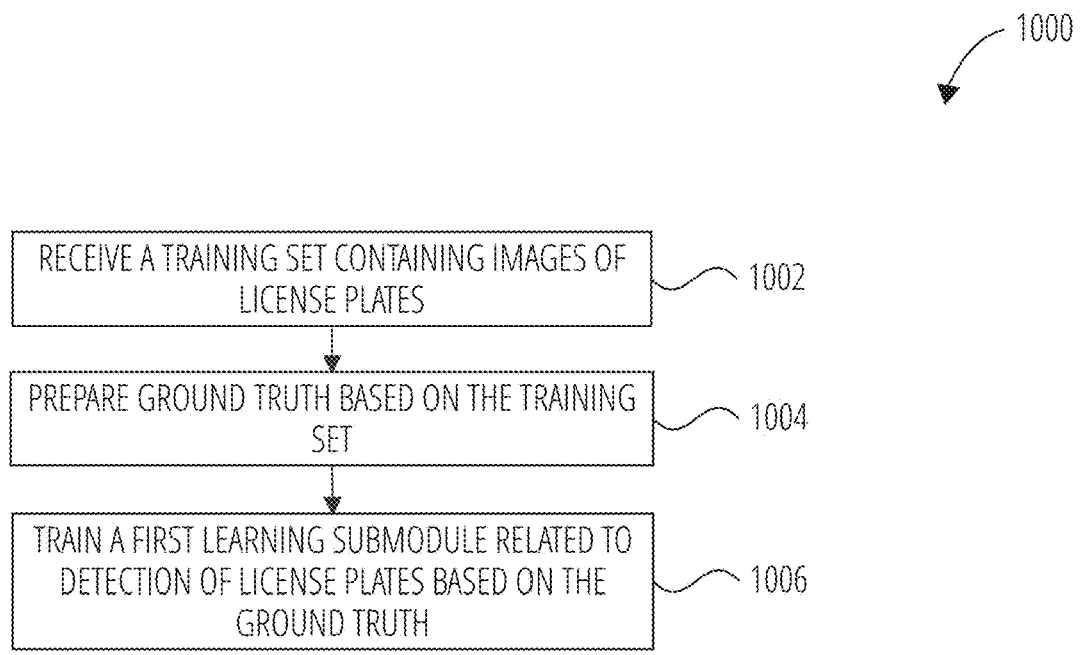
FIG. 10 is a flow diagram illustrating a method for training learning submodules, in accordance with an example embodiment.

FIG. 10 is a flow diagram illustrating a method for training learning submodules of the LPDR system of FIG. 3, in accordance with an example embodiment. Operations in the method 1000 may be performed by the license plate detection and recognition system 122, using components (e.g., modules, engines) described above with respect to FIG. 3. Accordingly, the method 1000 is described by way of example with reference to the LPD module 304. However, it shall be appreciated that at least some of the operations of the method 1000 may be deployed on various other hardware configurations or be performed by similar components residing elsewhere.

At block 1002, the LPD module 304 receives a training set containing images of license plates. At block 1004, the LPD module 304 prepares (after a manual validation process) ground truth based on the training set. At block 1006, the LPD module 304 trains a first learning submodule related to the detection of license plates based on the ground truth.

FIG. 11 illustrates an exemplary input image that includes a single license plate in accordance with one example embodiment. The image input module 302 may receive the image 1102. The LPD module 304 detects the license plate region 1104.

Figure 12:
FIG. 12 illustrates an exemplary input image that includes multiple license plates in accordance with one example embodiment.
Figure 13:
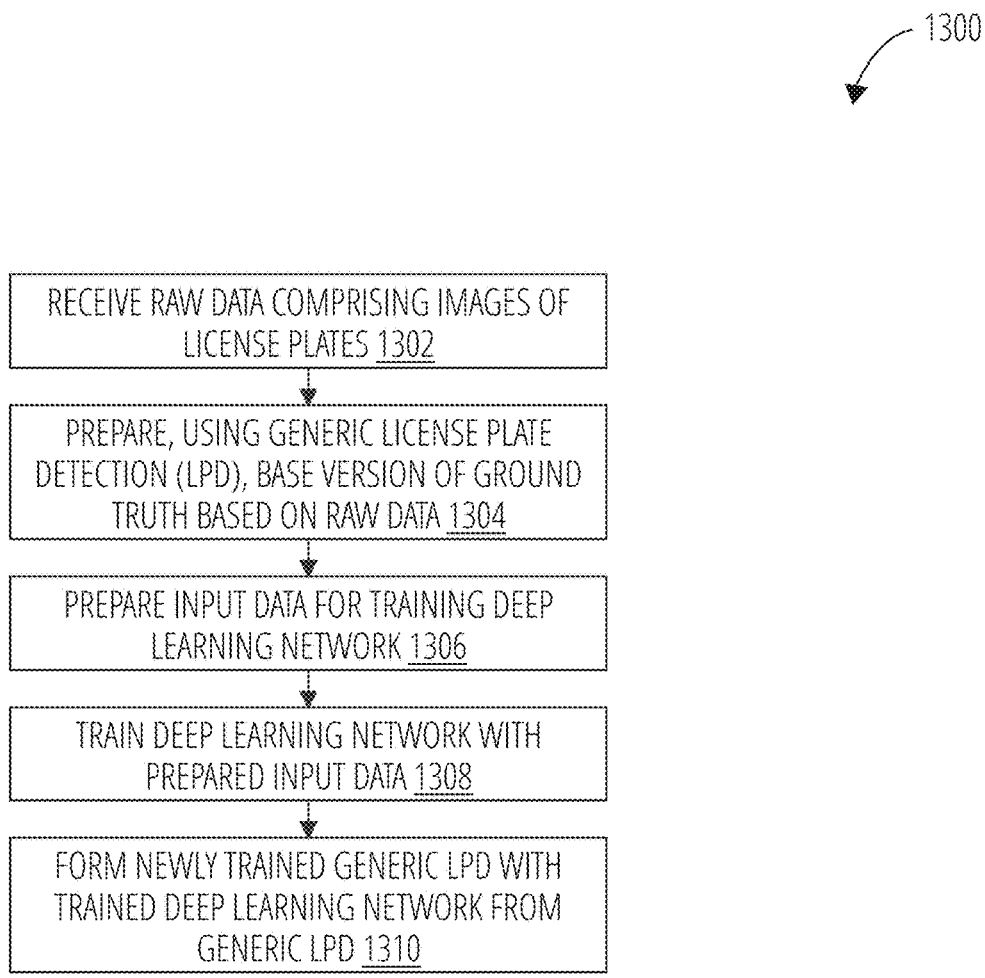
FIG. 13 illustrates a routine in accordance with one embodiment.

FIG. 12 illustrates an exemplary input image 1202 that includes several license plates in accordance with one example embodiment. The LPD module 304 detects the coordinates of bounding boxes of the multiple license plates (license plate 1204, license plate 1206, license plate 1208). In one example embodiment, the LPD module 304 detects and marks the bounding boxes of the license plates 1204, 1206, 1208 in such a way that the bounding boxes when displayed on the display device mostly do not overlap with each other.

Although, three images of license plates 1204, 1206, 1208 are illustrated herein for detection by the LPD module 304, it would be apparent to one of ordinary skill in the art, that the LPD module 304 is configured to detect and report all clearly visible LPs of expected sizes.

In block 1302, routine 1300 receives raw data comprising images of license plates. In block 1304, routine 1300 prepares, using a generic license plate detection (LPD), a base version of a ground truth based on the raw data. In block 1306, routine 1300 prepares input data for training a deep learning network. In block 1308, routine 1300 trains the deep learning network with the prepared input data. In block 1310, routine 1300 forms a newly trained generic LPD with the trained deep learning network from the generic LPD.

Figure 14:
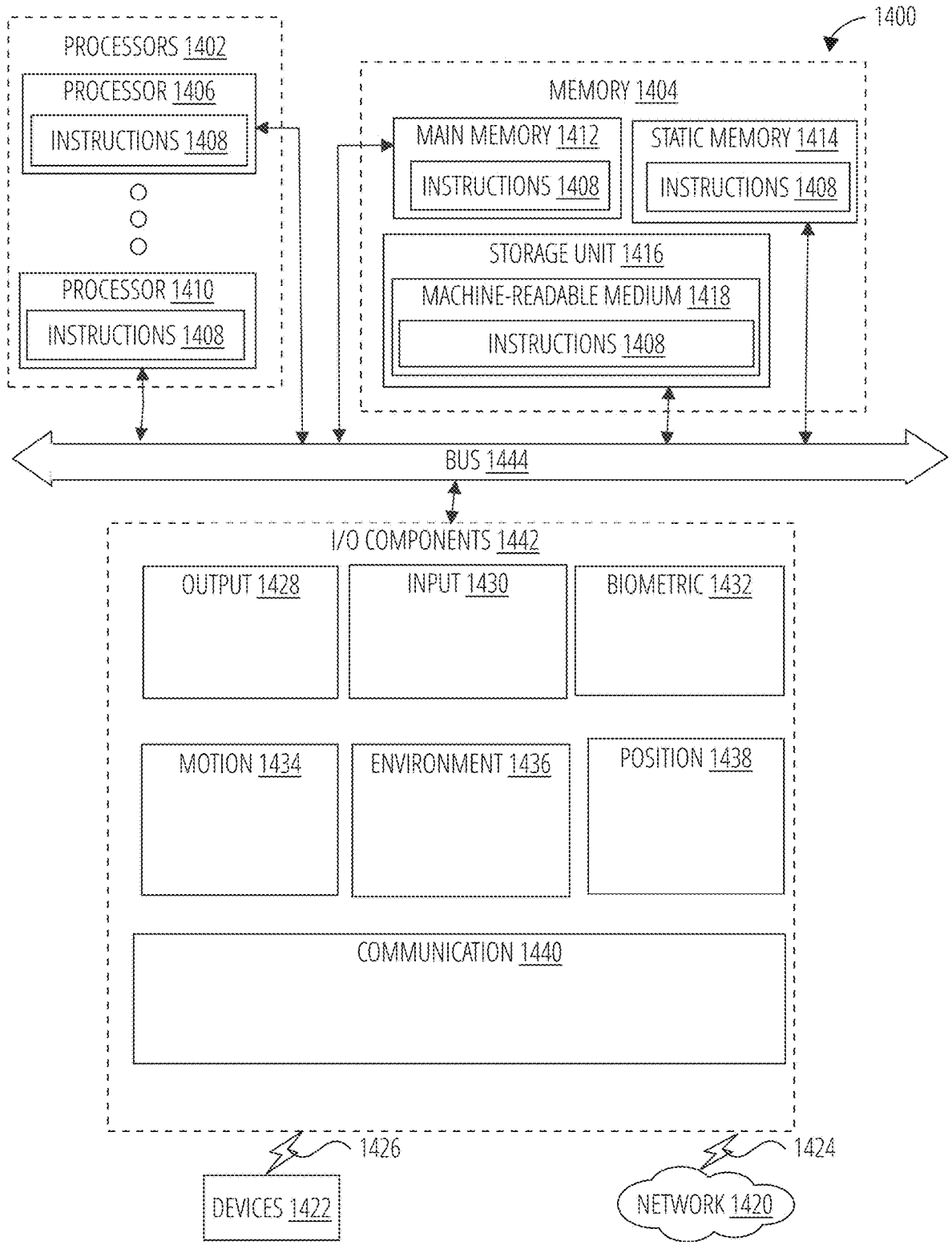
FIG. 14 is a diagrammatic representation of a machine in the form of a computer system within which a set of instructions may be executed for causing the machine to perform any one or more of the methodologies discussed herein, according to an example embodiment.

FIG. 14 is a diagrammatic representation of the machine 1400 within which instructions 1408 (e.g., software, a program, an application, an applet, an app, or other executable code) for causing the machine 1400 to perform any one or more of the methodologies discussed herein may be executed. For example, the instructions 1408 may cause the machine 1400 to execute any one or more of the methods described herein. The instructions 1408 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1408, sequentially or otherwise, that specify actions to be taken by the machine 1400. Further, while only a single machine 1400 is illustrated, the term "machine" shall also be taken to include a collection of machines that individually or jointly execute the instructions 1408 to perform any one or more of the methodologies discussed herein.

The machine 1400 may include processors 1402, memory 1404, and I/O components 1442, which may be configured to communicate with each other via a bus 1444. In an example embodiment, the processors 1402 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1406 and a processor 1410 that execute the instructions 1408. The term "processor" is intended to include multi-core processors that may comprise two or more independent processors (sometimes referred to as "cores") that may execute instructions contemporaneously. Although FIG. 14 shows multiple processors 1402, the machine 1400 may include a single processor with a single core, a single processor with multiple cores (e.g., a multi-core processor), multiple processors with a single core, multiple processors with multiples cores, or any combination thereof.

The memory 1404 includes a main memory 1412, a static memory 1414, and a storage unit 1416, both accessible to the processors 1402 via the bus 1444. The main memory 1404, the static memory 1414, and storage unit 1416 store the instructions 1408 embodying any one or more of the methodologies or functions described herein. The instructions 1408 may also reside, completely or partially, within the main memory 1412, within the static memory 1414, within machine-readable medium 1418 within the storage unit 1416, within at least one of the processors 1402 (e.g., within the processor's cache memory), or any suitable combination thereof, during execution thereof by the machine 1400.

The I/O components 1442 may include a wide variety of components to receive input, provide output, produce output, transmit information, exchange information, capture measurements, and so on. The specific 1/O components 1442 that are included in a particular machine will depend on the type of machine. For example, portable machines such as mobile phones may include a touch input device or other such input mechanisms, while a headless server machine will likely not include such a touch input device. It will be appreciated that the I/O components 1442 may include many other components that are not shown in FIG. 14. In various example embodiments, the I/O components 1442 may include output components 1428 and input components 1430. The output components 1428 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1430 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1442 may include biometric components 1432, motion components 1434, environmental components 1436, or position components 1438, among a wide array of other components. For example, the biometric components 1432 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1434 include acceleration sensor components (e.g., accelerometer), gravitation sensor components, rotation sensor components (e.g., gyroscope), and so forth. The environmental components 1436 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1438 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1442 further include communication components 1440 operable to couple the machine 1400 to a network 1420 or devices 1422 via a coupling 1424 and a coupling 1426, respectively. For example, the communication components 1440 may include a network interface component or another suitable device to interface with the network 1420. In further examples, the communication components 1440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1422 may be another machine or any of a wide variety of peripheral devices (e.g., a peripheral device coupled via a USB).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1440, such as location via Internet Protocol (IP) geolocation, location via Wi-Fi@ signal triangulation, location via detecting an NFC beacon signal that may indicate a particular location, and so forth.

The various memories (e.g., memory 1404, main memory 1412, static memory 1414, and/or memory of the processors 1402) and/or storage unit 1416 may store one or more sets of instructions and data structures (e.g., software) embodying or used by any one or more of the methodologies or functions described herein. These instructions (e.g., the instructions 1408), when executed by processors 1402, cause various operations to implement the disclosed embodiments.

The instructions 1408 may be transmitted or received over the network 1420, using a transmission medium, via a network interface device (e.g., a network interface component included in the communication components 1440) and using any one of a number of well-known transfer protocols (e.g., hypertext transfer protocol (HTTP)). Similarly, the instructions 1408 may be transmitted or received using a transmission medium via the coupling 1426 (e.g., a peer-to-peer coupling) to the devices 1422.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

Example 1 is a computer-implemented method comprises: receiving raw data comprising images of license plates; preparing, using a generic license plate detection (LPD), a base version of a ground truth based on the raw data; preparing input data for training a deep learning network; training the deep learning network with the prepared input data; and forming a newly trained generic LPD with the trained deep learning network.

In example 2, the subject matter of example 1, further comprises: testing the newly trained generic LPD.

In example 3, the subject matter of example 1, further comprises: wherein the raw data further comprises license plates from a plurality of countries, bounding boxes, and vehicle types.

In example 4, the subject matter of example 1, further comprises: wherein preparing the base version of the ground truth further comprises: operating the generic LPD on the raw data to generate bounding boxes, classes, and country tags, the raw data further comprising existing information about bounding boxes, classes, and country tags; and validating, using the generic LPD, the generated bounding boxes, classes, and country tags with the existing information from the raw data.

In example 5, the subject matter of example 1, further comprises: wherein preparing the input data further comprises: gathering media data for a plurality of countries; forming an image of a license plate from a video frame; collecting the gathered media data separately for single row license plates and multiline license plates; splitting the single row and the multiline sets of data into training and validation sets; and saving the training and validation sets in a specific format.

In example 6, the subject matter of example 1, further comprises: wherein the deep learning network receives an input image and outputs a bounding box corresponding to a license plate in the input image.

In example 7, the subject matter of example 1, further comprises: wherein an output for the ground truth for license plate further comprises: initially autogenerated GT for license plates at images, and validation and suggestions for modifying of already existing GT for license plates.

In example 8, the subject matter of example 1, further comprises: updating the generic LPD with the newly trained LPD.

In example 9, the subject matter of example 1, further comprises: forming a customized LPD for each country.

In example 10, the subject matter of example 1, further comprises: wherein the deep neural network comprises a convolutional neural network (CNN).

What is claimed is:

1. A computer-implemented method comprising: receiving raw data comprising images of license plates from a plurality of countries;
preparing, using a generic license plate detection (LPD), a base version of a ground truth based on the raw data, the generic (LPD) being trained based on the images of license plates from the plurality of countries; wherein preparing the base version of the ground truth further comprises: operating the generic (LPD) on the raw data to generate bounding boxes, classes, and country tags, the raw data further comprising existing information about bounding boxes, classes, and country tags; and validating, using the generic (LPD), the generated bounding boxes, classes, and country tags with the existing information from the raw data;
preparing input data for training a deep learning network; training the deep learning network with the prepared input data; and forming a newly trained generic (LPD) with the trained deep learning network, the newly trained generic (LPD) comprising a version of the generic (LPD) customized for one of the plurality of countries.

2. The computer-implemented method of claim 1, further comprising:
testing the newly trained generic (LPD).

3. The computer-implemented method of claim 1, wherein the raw data further comprises bounding boxes, and vehicle types.

4. The computer-implemented method of claim 1, wherein preparing the input data further comprises:
gathering media data for the plurality of countries;
forming an image of a license plate from a video frame;
collecting the gathered media data separately for single row license plates and multiline license plates;
splitting the single row and the multiline sets of data into training and validation sets; and
saving the training and validation sets in a specific format.

5. The computer-implemented method of claim 1, wherein the deep learning network receives an input image and outputs a bounding box corresponding to a license plate in the input image.

6. The computer-implemented method of claim 1, wherein an output for the ground truth GT for license plate further comprises: initially autogenerated (GT) for license plates at images, and validation and suggestions for modifying of already existing (GT) for license plates.

7. The computer-implemented method of claim 1, further comprising:
updating the generic (LPD) with the newly trained generic (LPD).

8. The computer-implemented method of claim 1, further comprising:
forming a customized (LPD) for each country.

9. The computer-implemented method of claim 1, wherein the deep neural network comprises a convolutional neural network (CNN).

10. A computing apparatus, the computing apparatus comprising: a processor; and a memory storing instructions that, when executed by the processor, configure the apparatus to: receive raw data comprising images of license plates from a plurality of countries; prepare, using a generic license plate detection (LPD), a base version of a ground truth based on the raw data, the generic (LPD) being trained based on the images of license plates from the plurality of countries;
wherein preparing the base version of the ground truth further comprises: operate the generic (LPD) on the raw data to generate bounding boxes, classes, and country tags, the raw data further comprising existing information about bounding boxes, classes, and country tags; and validate, using the generic (LPD), the generated bounding boxes, classes, and country tags with the existing information from the raw data; prepare input data for training a deep learning network; train the deep learning network with the prepared input data; and form a newly trained generic (LPD) with the trained deep learning network, the newly trained generic (LPD) comprising a version of the generic (LPD) customized for one of the plurality of countries.

11. The computing apparatus of claim 10, wherein the instructions further configure the apparatus to:
test the newly trained generic (LPD).

12. The computing apparatus of claim 10, wherein the raw data further comprises bounding boxes, and vehicle types.

13. The computing apparatus of claim 10, wherein preparing the input data further comprises:
gathering media data for the plurality of countries;
form an image of a license plate from a video frame;
collect the gathered media data separately for single row license plates and multiline license plates;
split the single row and the multiline sets of data into training and validation sets; and
save the training and validation sets in a specific format.

14. The computing apparatus of claim 10, wherein the deep learning network receives an input image and outputs a bounding box corresponding to a license plate in the input image.

15. The computing apparatus of claim 10, wherein an output for the ground truth (GT) for license plate further comprises: initially autogenerated (GT) for license plates at images, and validation and suggestions for modifying of already exist (GT) for license plates.

16. The computing apparatus of claim 10, wherein the instructions further configure the apparatus to:
update the generic (LPD) with the newly trained (LPD).

17. The computing apparatus of claim 10, wherein the instructions further configure the apparatus to:
form a customized (LPD) for each country.

18. A non-transitory computer-readable storage medium, the computer-readable storage medium including instructions that when executed by a computer, cause the computer to:
receive raw data comprising images of license plates from a plurality of countries; prepare, using a generic license plate detection (LPD), a base version of a ground truth based on the raw data, the generic (LPD) being trained based on the images of license plates from the plurality of countries;
wherein preparing the base version of the ground truth further comprises: operating the generic (LPD) on the raw data to generate bounding boxes, classes, and country tags, the raw data further comprising existing information about bounding boxes, classes, and country tags; and validating, using the generic (LPD), the generated bounding boxes, classes, and country tags with the existing information from the raw data; prepare input data for training a deep learning network; train the deep learning network with the prepared input data; and form a newly trained generic (LPD) with the trained deep learning network, the newly trained generic (LPD) comprising a version of the generic (LPD) customized for one of the plurality of countries.

* * * * *

UNITED STATES PATENT AND TRADEMARK OFFICE
CERTIFICATE OF CORRECTION

Page 1 of 1

PATENT NO. : 11,164,028 B2
APPLICATION NO. : 16/444941
DATED : November 2, 2021
INVENTOR(S) : Popov et al.

It is certified that error appears in the above-identified patent and that said Letters Patent is hereby corrected as shown below:

On the Title Page

Item (72), in "Inventors", in Column 1, Line 1, delete "Novgorod" and insert --Nizhny Novgorod-- therefor Item (72), in "Inventors", in Column 1, Line 3, delete "Novgorod" and insert --Nizhny Novgorod-- therefor Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*